US009417507B2

(12) United States Patent
Ishikawa et al.

(10) Patent No.: US 9,417,507 B2
(45) Date of Patent: Aug. 16, 2016

(54) ELECTRONIC APPARATUS

(71) Applicant: CANON KABUSHIKI KAISHA, Tokyo (JP)

(72) Inventors: Koji Ishikawa, Kawasaki (JP); Shuichi Idera, Kawasaki (JP); Kanae Nakamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/709,186

(22) Filed: May 11, 2015

(65) Prior Publication Data

US 2015/0334275 A1    Nov. 19, 2015

(30) Foreign Application Priority Data

May 14, 2014    (JP) ................................. 2014-100827

(51) Int. Cl.
*H04N 5/225* (2006.01)
*G03B 17/02* (2006.01)
*H04N 5/232* (2006.01)

(52) U.S. Cl.
CPC ................ *G03B 17/02* (2013.01); *H04N 5/225* (2013.01); *H04N 5/2252* (2013.01); *H04N 5/23245* (2013.01)

(58) Field of Classification Search
CPC ... H04N 5/225; H04N 5/2251; H04N 5/2252; H04N 5/2253; H04N 5/2254; H04N 5/23245; G03B 17/02
See application file for complete search history.

(56) References Cited

U.S. PATENT DOCUMENTS

| 5,752,117 A * | 5/1998 | Hori ....................... G03B 17/38 396/504 |
| 6,393,218 B1 * | 5/2002 | Iwasaki .................. G03B 17/04 396/349 |
| 9,264,593 B2 * | 2/2016 | Takahashi ............ H04N 5/2254 |
| 2011/0286110 A1 * | 11/2011 | Ota ......................... G02B 7/102 359/694 |

FOREIGN PATENT DOCUMENTS

| JP | 2004-343283 A | 12/2004 |
| JP | 2006-244977 A | 9/2006 |

* cited by examiner

*Primary Examiner* — Luong T Nguyen
(74) *Attorney, Agent, or Firm* — Canon USA, Inc. IP Division (57) ABSTRACT

An electronic apparatus includes a base member, a switch, an operation member, a movable member, and a pressing member, wherein the pressing member has a pressing portion configured to press the switch and a sliding portion which slides on the movable member being formed on the pressing member, wherein in a case where the operation member is linearly operated in a first or second direction, the pressing member moves in a third direction orthogonal to the first and second directions by sliding of the sliding portion of the pressing member on the movable member, and the pressing portion presses the switch.

12 Claims, 11 Drawing Sheets

SECTION: W-W

ELECTRONIC APPARATUS

BACKGROUND OF THE INVENTION

1. Field of the Invention

The invention relates to an electronic apparatus.

2. Description of the Related Art

Japanese Patent Application Laid-Open No. 2004-343283 discusses a camera provided with a horizontal position lease button at a position to which the index finger is easily accessible when the camera is held in a horizontal position and a vertical position lease button at a position to which the index finger is easily accessible when the camera is held in a vertical position.

SUMMARY OF THE INVENTION

According to an aspect of the present invention, an electronic apparatus includes a base member, a switch, an operation member configured to linearly move in a first direction and a second direction orthogonal to the first direction with respect to the base member, a movable member configured to linearly move integrally with the operation member, in a case where the operation member is linearly operated in the first direction or the second direction, and a pressing member, configured to move in a third direction orthogonal to the first and second directions, a pressing portion configured to press the switch, and a sliding portion which slides on the movable member being formed on the pressing member, wherein in a case where the operation member is linearly operated in the first or second direction, the pressing member moves in the third direction by sliding of the sliding portion of the pressing member on the movable member, and the pressing portion presses the switch.

Further features of the invention will become apparent from the following description of exemplary embodiments (with reference to the attached drawings).

DESCRIPTION OF THE EMBODIMENTS

The following describes in detail preferable exemplary embodiments of the invention with reference to the attached drawings.

Figure 1A:
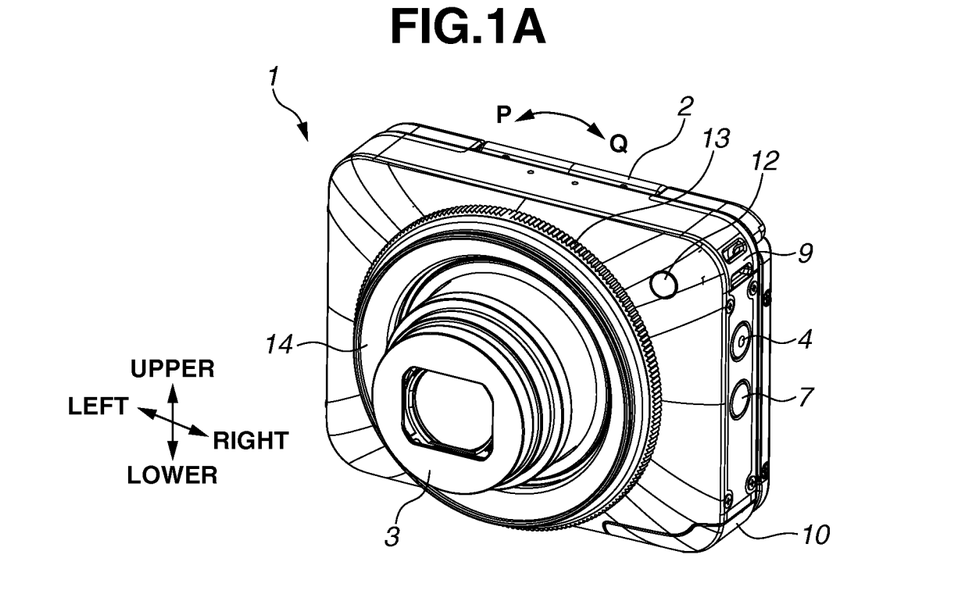
FIGS. 1A and 1B are external perspective views each illustrating a digital camera as an example of an electronic apparatus according to an exemplary embodiment of the invention.
Figure 1B:
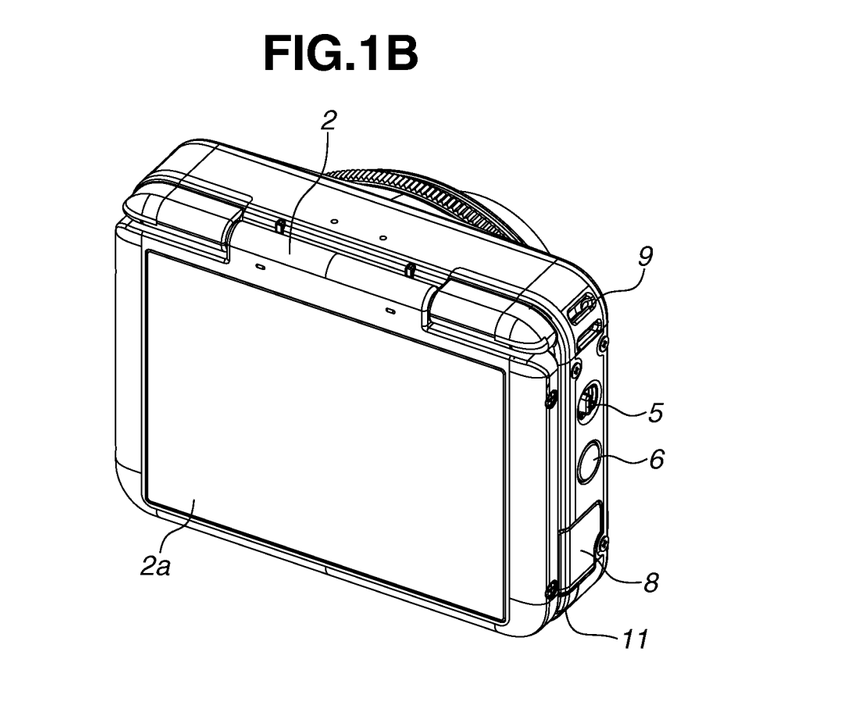

FIGS. 1A and 1B are external perspective views illustrating a digital camera as an example of an electronic apparatus according to an exemplary embodiment of the invention.

FIG. 1A is the external perspective view of the digital camera viewed from the front side (object side) thereof. FIG. 1B is the external perspective view of the digital camera viewed from the back side (user side) thereof.

The digital camera illustrated in FIGS. 1A and 1B is in an image picking-up state where a lens unit 3 projects into the object side. When the digital camera is switched to a standby state, the lens unit 3 sinks into a position where the lens unit 3 does not protrude from a camera main body (apparatus main body) 1 and is stored.

A display unit 2 is rotatably supported by the camera main body 1 via a hinge mechanism in a range of a predetermined angle and electrically connected to the camera main body 1 via a flexible wiring board. FIGS. 1A and 1B are diagrams each illustrating a state where the display unit 2 is closed to the camera main body 1.

A display section 2a uses a liquid crystal panel unit, for example, and displays an image and a playback image for confirming a composition at image capturing. An electrostatic capacity touch panel is incorporated into the display section 2a.

In the image picking-up state where the lens unit 3 projects to the object side, an object image is formed on an image sensor. Pressing a power source button 4 switches operation states of the digital camera between the image picking-up state and the standby state. In a case where the digital camera is switched to the image picking-up state by pressing the power source button 4, the operation mode of the digital camera is switched to an image picking-up mode.

Operating a mode switching lever 5 allows the image picking-up mode of the digital camera to be switched. Operating a communication button 6 starts wireless communication, such as Wireless Fidelity (Wi-Fi).

In the image picking-up state of the digital camera, pressing a playback button 7 allows the operation mode of the digital camera to be switched from the image picking-up mode to a playback mode. In the standby state of the digital camera, pressing the playback button 7 starts the digital camera in the playback mode.

A terminal cover 8 is linearly movably and rotatably supported by the camera main body 1. Opening the terminal cover 8 exposes external connection terminals, such as a Universal Serial Bus (USB) terminal and a High-Definition Multimedia Interface (HDMI) (registered trademark) terminal.

A strap base 9 through which a strap is threaded is formed each on the left and right sides of the camera. A battery lid 10 is linearly movably and rotatably supported by the camera main body 1. The battery lid 10 is opened and a battery can be inserted into or removed from the camera main body 1.

A card lid 11 is linearly movably and rotatably attached to the camera main body 1. The card lid 11 is opened and a recording medium can be inserted into or removed from the camera main body 1.

An illumination window 12 is formed of a transparent member and guides and diffuses light from a light emission element arranged in the camera. The light emission element emits light when an image is captured at a low illuminance or auto-focus (AF) is operated at a low illuminance.

A zoom ring 13 is of a ring shape and arranged around the lens unit 3. The zoom ring 13 is turned around the optical axis of the lens unit 3 in P and Q directions (refer to FIG. 1A) with respect to the camera main body 1 in a range of a predetermined angle.

Turning the zoom ring 13 to the P direction causes a focal length of the lens unit 3 to zoom in to a telephoto direction. Turning the zoom ring 13 to the Q direction causes a focal length of the lens unit 3 to zoom in to a wide-angle direction. When a user turns the zoom ring 13 and then releases his/her finger from the zoom ring 13, the zoom ring 13 is returned to a neutral position by a spring.

A concavo-convex shaped portion is formed on the whole circumference of the zoom ring 13 to improve finger access.

A release ring 14 is of a ring shape and arranged around the lens unit 3. The release ring 14 is smaller than the zoom ring 13 in outside diameter. The release ring 14 is arranged in such a manner that the release ring 14 is extruded further ahead of the digital camera than the zoom ring 13. The release ring 14 can be linearly operated in a predetermined range in the upper and lower directions and the left and right directions orthogonal to the optical axis of the lens unit 3 (refer to FIG. 1A) with respect to the camera main body 1.

Operating linearly the release ring 14 in the upper and lower directions executes the release operation to allow still image capturing to be executed.

Similarly, operating linearly the release ring 14 in the left and right directions also executes the release operation to allow still image capturing to be executed.

In general, the release switch of the digital camera is formed of a two-stage switch. The first stroke of the release switch turns on the first stage of a switch (SW1) to execute an auto-focus (AF) operation and an auto-exposure (AE) operation. The second stroke of the release switch turns on the second stage of a switch (SW2) to execute the still image capturing.

The release ring 14 can be linearly operated only in the predetermined range in the upper and lower directions and the left and right directions. Releasing the linear operation of the release ring 14 in the upper and lower directions or the left and right directions returns the release ring 14 to the neutral position by a spring force.

In FIGS. 1A and 1B, the zoom ring 13 and the release ring 14 are positioned at the neutral position.

The configuration of the zoom ring 13 and the release ring 14 is described in detail below.

Figure 2A:
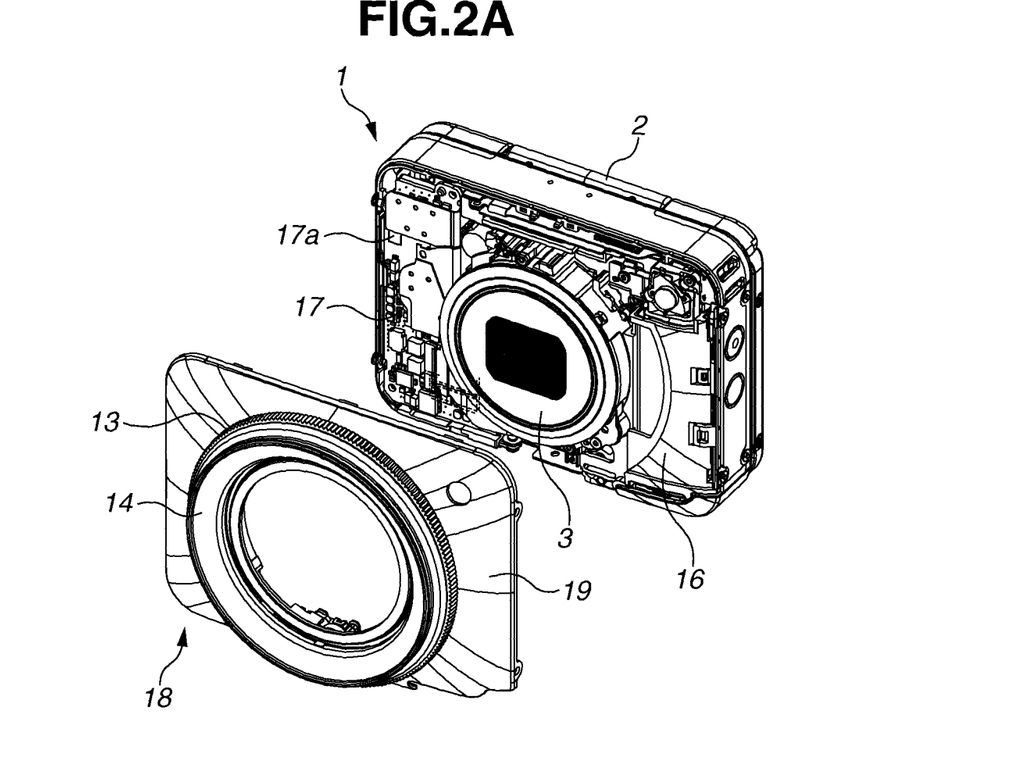
FIGS. 2A and 2B are partially exploded perspective views each illustrating the digital camera viewed from the front side of a front cover unit of the digital camera.
Figure 2B:
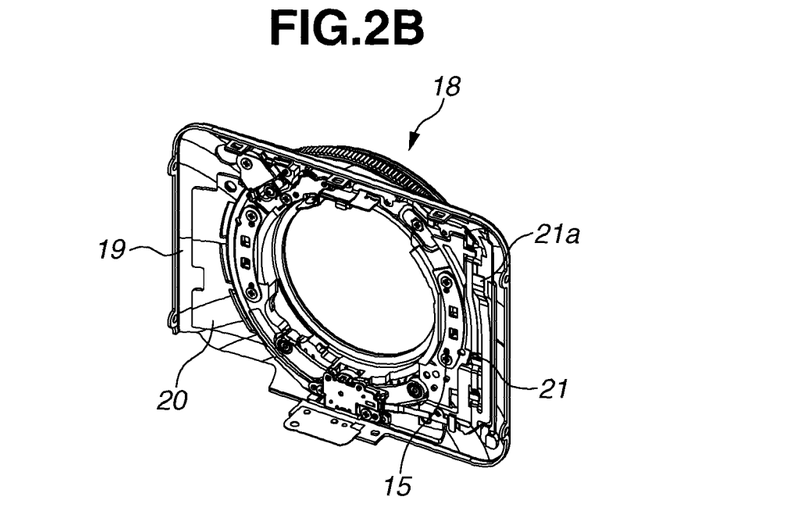

FIGS. 2A and 2B are partially exploded perspective views each illustrating the digital camera viewed from the front side of a front cover unit 18 thereof. FIG. 2A is a diagram illustrating a state where the front cover unit 18 is removed from the camera main body 1. FIG. 2B is a perspective view illustrating the front cover unit 18 removed from the camera main body 1, viewed from the back side thereof.

As illustrated in FIG. 2A, a battery chamber 16 for storing a battery for supplying power source to the camera is arranged on the right of the lens unit 3 of the camera main body 1. A main circuit board 17 on which a main central processing unit (CPU) is mounted is arranged on the left of the lens unit 3. The main circuit board 17, the display unit 2, and the lens unit 3 are electrically connected to each other via a flexible wiring board. A connector 17a for connecting a front flexible wiring board provided to the front cover unit 18 is mounted on the main circuit board 17.

The front cover unit 18 includes a front cover 19, a front inner 20, a front flexible wiring board 21, the zoom ring 13, and the release ring 14.

The front cover 19 is formed by applying drawing process to metallic materials. An opening portion 19a is formed at the center of the front cover 19. The front inner 20 is formed of a synthetic resin material. The front inner 20 is bonded and fixed to the back of the front cover 19 so that the front inner 20 is partially exposed in the opening portion 19a of the front cover 19.

An opening portion 20k is formed at the center of the front inner 20. Attaching the front cover unit 18 to the camera main body 1 causes a part of the lens unit 3 to be positioned inside the opening portion 20k of the front inner 20. Turing on the power source of the camera main body 1 causes a part of the lens unit 3 to be extended to the object side through the opening portion 20k of the front inner 20.

The front inner 20 functions as a base member for holding the zoom ring 13 and the release ring 14. The zoom ring 13 can be turned in a predetermined range with respect to the front inner 20. The release ring 14 can be linearly operated in a predetermined range with respect to the front inner 20.

The front flexible wiring board 21 is attached to the front inner 20. Switches for receiving the execution of the release and the zoom operation are mounted on the front flexible wiring board 21. A contact connection section 21a, the pattern of which is partially exposed, is formed at the leading edge of the front flexible wiring board 21. The contact connection section 21a of the front flexible wiring board 21 is connected with the connector 17a of the main circuit board 17. Thus, signals output from each switch by operating the zoom ring 13 and the release ring 14 are transferred to the main CPU mounted on the main circuit board 17.

The configuration of the front cover unit 18 is described in detail below with respect to FIGS. 3 to 7.

Figure 3:
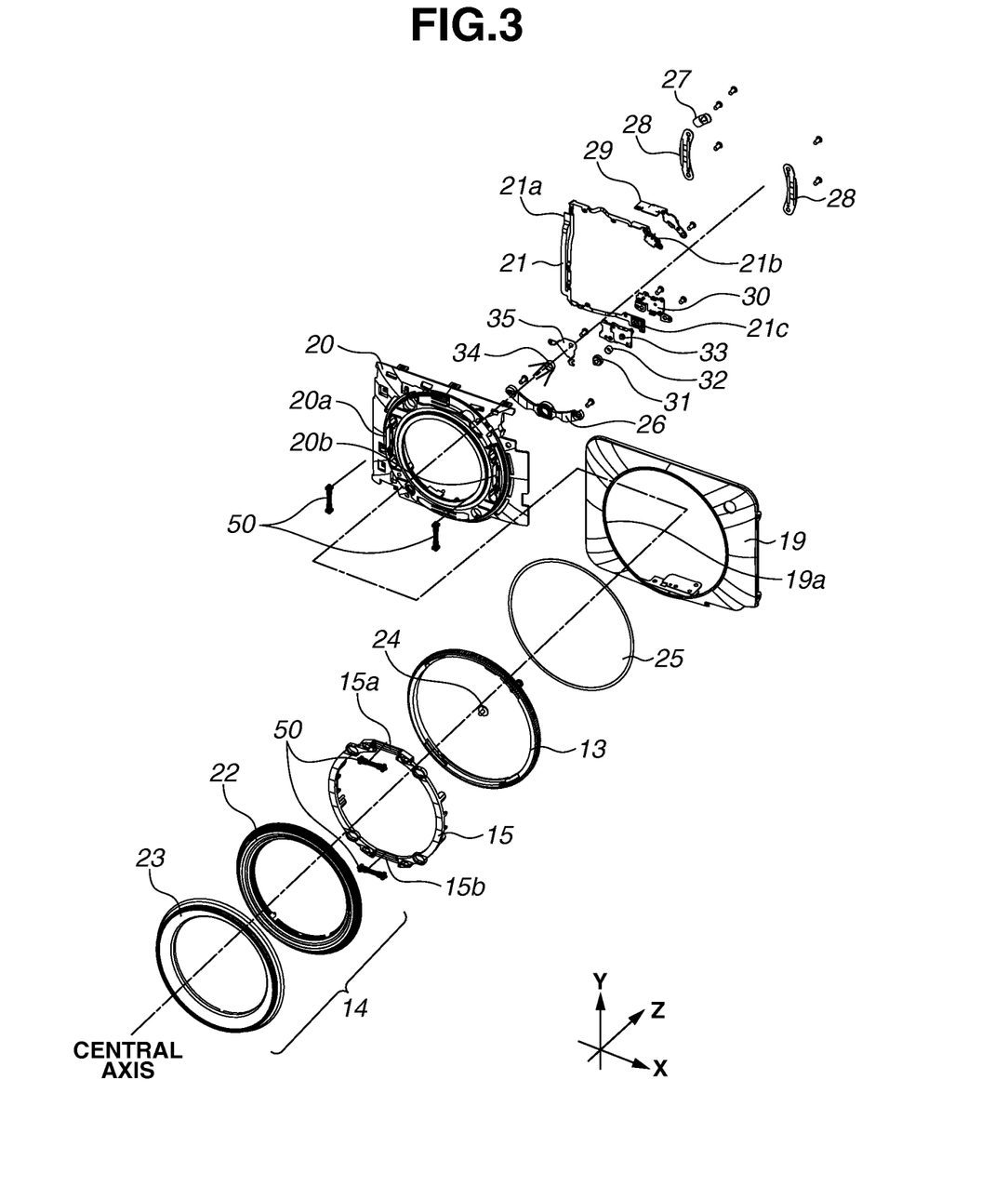
FIG. 3 is an exploded perspective view illustrating the front cover unit viewed from the front side of the digital camera.
Figure 4:
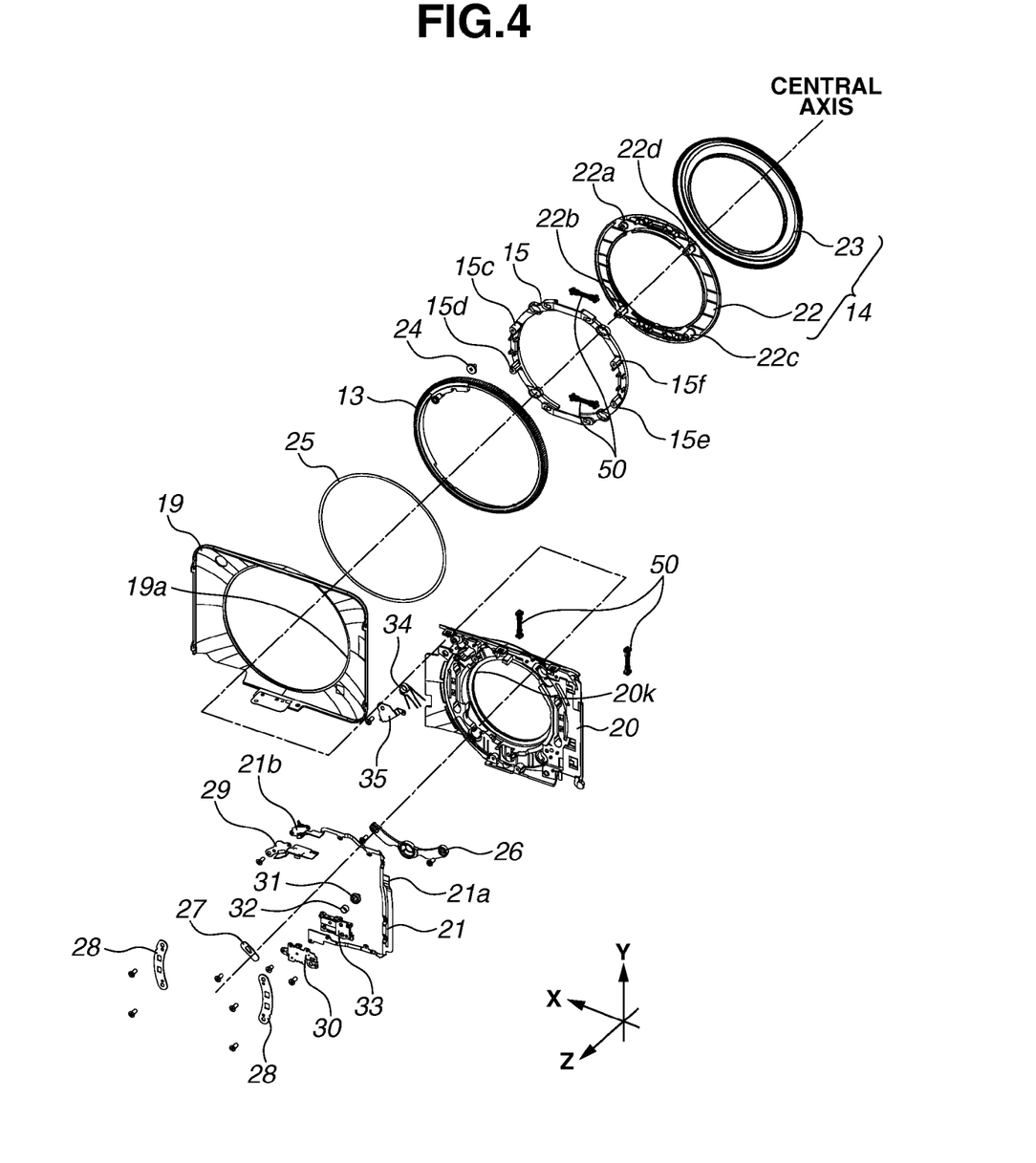
FIG. 4 is an exploded perspective view illustrating the front cover unit viewed from the back side of the digital camera.

FIG. 3 is an exploded perspective view illustrating the front cover unit 18 viewed from the front side of the digital camera. FIG. 4 is an exploded perspective view illustrating the front cover unit 18 viewed from the back side of the digital camera.

The front flexible wiring board 21 is attached to the back side of the front inner 20. A zoom switch 21b for detecting the turning operation of the zoom ring 13 is mounted on the front flexible wiring board 21. The zoom switch 21b includes a tiltable section which tilts in two opposite directions. Turning the zoom ring 13 in the telephoto direction causes the tiltable section of the zoom switch 21b to tilt in a first direction. Turning the zoom ring 13 in the wide-angle direction folds the tiltable section of the zoom switch 21b in a second direction. A signal output from the zoom switch 21b is transferred to the main CPU mounted on the main circuit board 17 to execute a zoom operation.

A release switch 21c for detecting the release ring 14 linearly operated in the upper, lower, left, and right directions is mounted on the front flexible wiring board 21. The release switch 21c is formed of a two-stage switch. When a first stage switch of the release switch 21c is turned on by linearly operating the release ring 14 in any of the upper, lower, left, and right directions, an SW1 signal is transferred to the main CPU mounted on the main circuit board 17 to execute the AF operation and the AE operation. When a second stage switch of the release switch 21c is turned on by linearly operating the release ring 14 in the same direction, an SW2 signal is transferred to the main CPU mounted on the main circuit board 17 to execute the still image capturing. The SW1 signal is an example of the first signal. The SW2 signal is an example of the second signal.

According to a first exemplary embodiment, even if the release ring 14 is linearly operated in any of the upper, lower, left, and right directions, the SW1 and SW2 signals are output from the release switch 21c. The front inner 20 functions as a base member. The release ring 14 functions as an operating member enabling a linear operation in a first direction (the upper and lower directions in FIG. 1 and the Y direction in FIG. 3) and a second direction orthogonal to the first direction (the left and right directions in FIG. 1 and the X direction in FIG. 3). The release switch 21c functions as a switch.

A torsion spring 34 is attached to the back of the front inner 20. The torsion spring 34 returns the zoom ring 13 to the neutral position. The arm of the torsion spring 34 is hooked on spring hooks of the front inner 20 and the zoom ring 13. The torsion spring 34 is attached to the back of the front inner 20 in such a manner that the boss portion of the front inner 20 is inserted into an end-turn portion of the torsion spring 34 and then a spring pressing member 35 is fixed to the boss portion of the front inner 20. The spring pressing member 35 is fixed to the back of the front inner 20, and therefore the torsion spring 34 is held between the front inner 20 and the spring pressing member 35, whereby the torsion spring 34 does not fall off from the front inner 20.

The front cover 19 is bonded and fixed to the front side of the front inner 20. Spring units 50 are attached to the front of the front inner 20 exposed in the opening portion 19a of the front cover 19. Each of the spring units 50 is attached to the left and the right of an opening portion 20k of the front inner 20.

Figure 5:
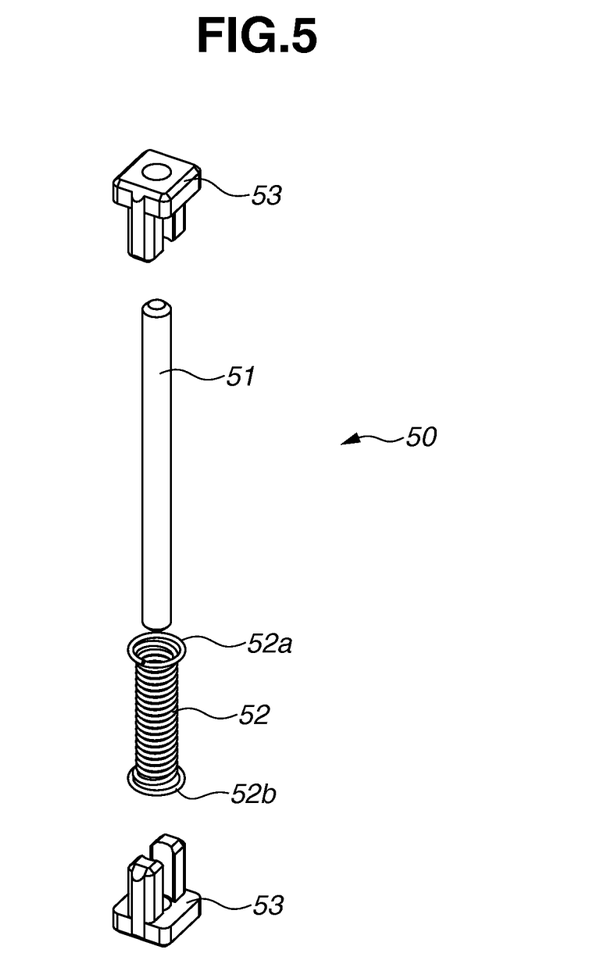
FIG. 5 is an exploded perspective view illustrating a spring unit.

FIG. 5 is an exploded perspective view illustrating the spring unit 50. The spring unit 50 includes a metal shaft 51, a coil spring 52, an engagement member 53. The spring unit 50 is configured in such a manner that the coil spring 52 is mounted on the metal shaft 51 and the engagement members 53 are attached to the metal shaft 51 so that the engagement members 53 are arranged at both ends of the coil spring 52. An upper winding end 52a and a lower winding end 52b of the coil spring 52 are larger than the center portion of the coil spring 52 in inside diameter. The engagement member 53 is formed of a synthetic resin material and attached to the metal shaft 51 so as to contact the upper winding end 52a and the lower winding end 52b of the coil spring 52. When the engagement member 53 is attached to the metal shaft 51, both ends of the metal shaft 51 pass through the engagement member 53 and protrude therefrom. The center portion of the coil spring 52 is the one guided by the metal shaft 51. A clearance between an outer diameter of the metal shaft 51 and an inside diameter of a center portion of the coil spring 52 is made small enough to the extent that no problem occurs in operation. This decreases the occurrence of a vibration sound caused by the interference between the outer diameter of the metal shaft 51 and the inside diameter of the coil spring 52.

Spring storing recess portions 20a and 20b are formed at the front side of the front inner 20 exposed in the opening portion 19a of the front cover 19. The spring storing recess portion 20a is formed on the left of the opening portion 20k of the front inner 20. The spring storing recess portion 20b is formed on the right of the opening portion 20k of the front inner 20. Each of the spring units 50 is attached to a different one of the spring storing recess portions 20a and 20b. Each of the engagement members 53 attached to both ends of the metal shaft 51 among the spring unit 50 engages with a different one of the spring storing recess portion 20a or 20b.

Then, the spring unit 50 is attached to the spring storing recess portion 20a or 20b with the coil spring 52 compressed.

Figure 6:
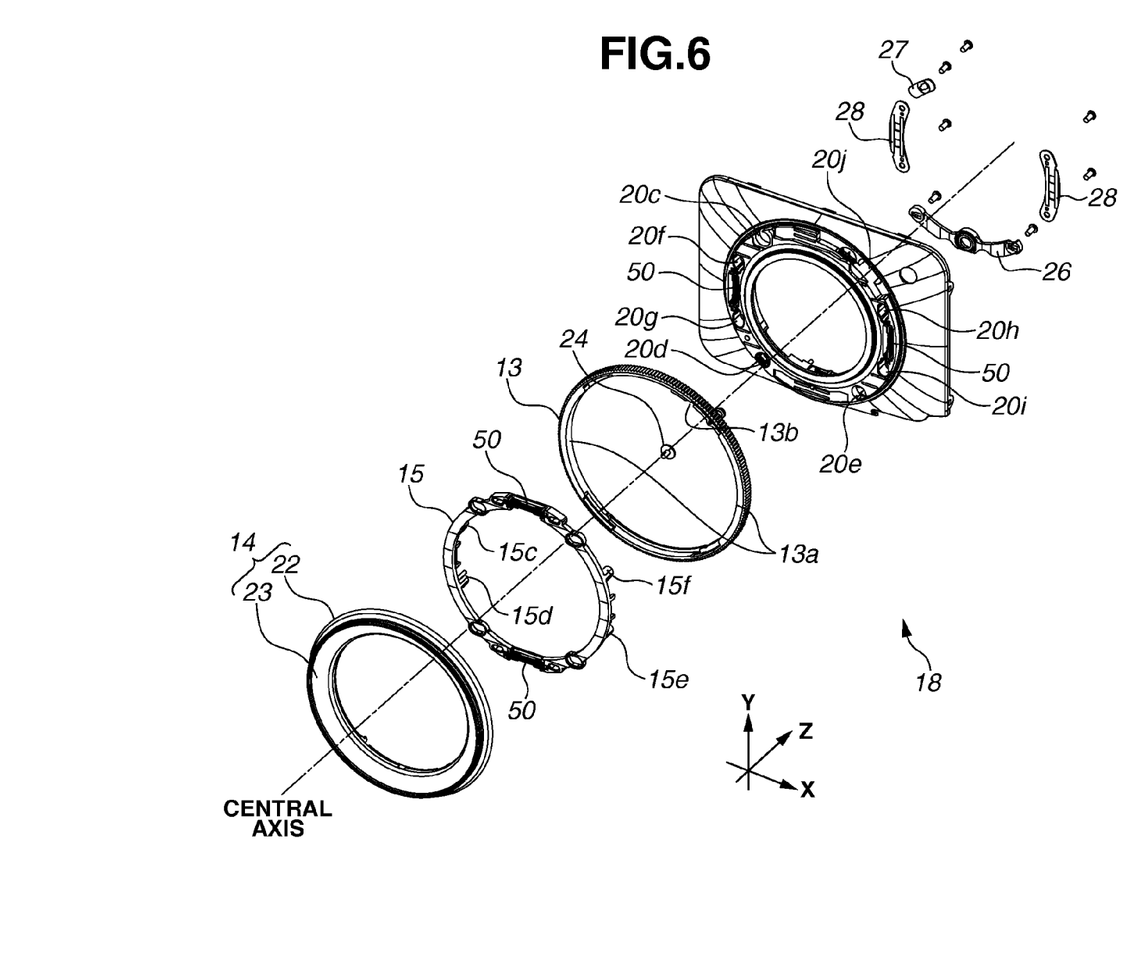
FIG. 6 is an exploded perspective view of the digital camera illustrating a state where the spring units are attached to spring storing recess portions of a front inner.

FIG. 6 is an exploded perspective view of the digital camera illustrating a state where the front flexible wiring board 21 and the torsion spring 34 are attached to the back of the front inner 20 and the spring units 50 are attached to the spring storing recess portions 20a and 20b of the front inner 20.

Figure 7A:
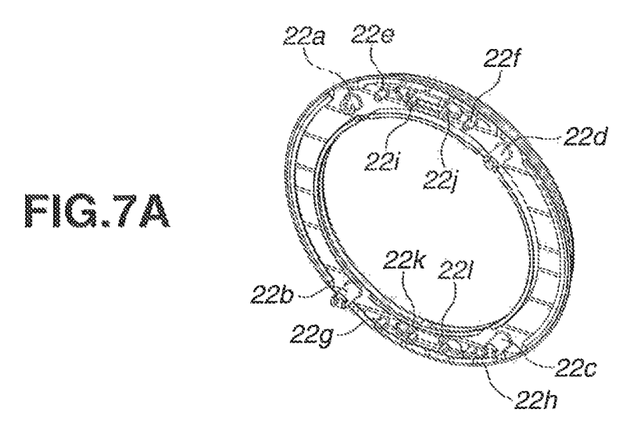
FIGS. 7A, 7B, and 7C are perspective views illustrating a release base, a Y-direction movement ring, and a zoom ring, respectively.
Figure 7B:
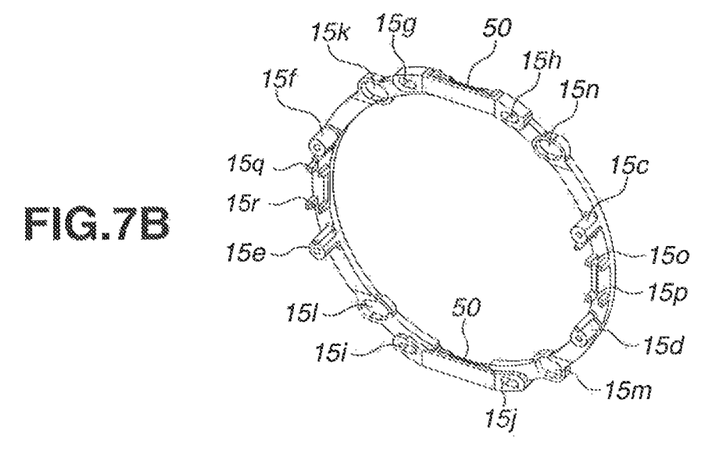
Figure 7C:
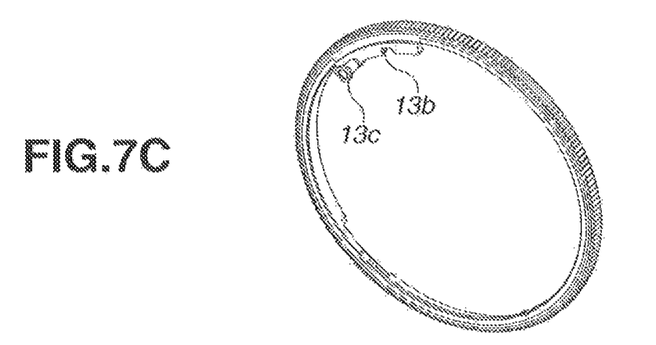

FIGS. 7A, 7B, and 7C are perspective views illustrating a release base 22, a Y-direction movement ring 15, and a zoom ring 13, respectively.

For the convenience of design and strength, the release ring 14 is configured in such a manner that the release base 22 formed of a synthetic resin material and a release cap 23 formed of a metallic material are stuck together. The release base 22 and the release cap 23 are ring-shaped.

The zoom ring 13 is arranged at the front side of the front inner 20 exposed in the opening portion 19a of the front cover 19. As illustrated in FIGS. 3 and 4, a slide sheet 25 is attached on the back of the zoom ring 13. As illustrated in FIG. 7C, a spring hook 13c is formed on the zoom ring 13. The spring hook 13c on the zoom ring 13 passes through a hole 20j formed in the front inner 20 and contacts with the arm of the torsion spring 34. Thereby, the torsion spring 34 urges the zoom ring 13 to the neutral position.

A Y-direction movement ring 15 capable of moving only to the Y direction is attached at the front side of the front inner 20 exposed in the opening portion 19a of the front cover 19 and inside the zoom ring 13. As illustrated in FIG. 7B, shafts 15c, 15d, 15e, and 15f are projectingly formed on the back of the Y-direction movement ring 15. Elongate holes 20f, 20g, 20h, and 20i are formed at the front side of the front inner 20 exposed in the opening portion 19a of the front cover 19. The shafts 15c, 15d, 15e, and 15f are inserted into the elongate holes 20f, 20g, 20i, and 20h respectively. The elongate holes 20f, 20g, 20i, and 20h are shaped long in the Y direction. This enables the Y-direction movement ring 15 to be moved only in the Y direction. The Y-direction movement ring 15 functions as a movement member attached to be capable of moving only in the first direction with respect to the front inner 20. The shafts 15c, 15d, 15e, and 15f and the elongate holes 20f, 20g, 20i, and 20h function as a first guide unit which moves the Y-direction movement ring 15 only in the first direction (Y direction) with respect to the front inner 20.

The shafts 15c, 15d, 15e, and 15f are inserted into the elongate holes 20f, 20g, 20i, and 20h, and then, holding plates 28 are fixed to the shafts 15c, 15d, 15e, and 15f passing through the front inner 20 by screws. Therefore, the Y-direction movement ring 15 is attached to the front inner 20 in a state where the front inner 20 is held between the Y-direction movement ring 15 and the holding plates 28.

As illustrated in FIG. 7B, engagement portions 15o, 15p, 15q, and 15r are projectingly formed on the back side of the Y-direction movement ring 15. Attaching the Y-direction movement ring 15 to the front inner 20 causes the engagement members 53 attached to the spring storing recess portion 20a to engage with the engagement portions 15o and 15p respectively. Attaching the Y-direction movement ring 15 to the front inner 20 causes the engagement members 53 attached to the spring storing recess portion 20b to engage with the engagement portions 15q and 15r respectively. Attaching the Y-direction movement ring 15 to the front inner 20 causes the engagement portions 15o, 15p, 15q, and 15r to contact with the upper winding end 52a or the lower winding end 52b of the coil spring 52 of the spring units 50 attached to the spring storing recess portions 20a and 20b.

Thereby, the Y-direction movement ring 15 is urged by the spring units 50 each attached to the spring storing recess portions 20a and 20b to the neutral position in the Y direction. In the state where the Y-direction movement ring 15 is attached to the front inner 20, the spring units 50 attached to the spring storing recess portions 20a and 20b are arranged in the projection surface of the Y-direction movement ring 15. The spring units 50 each attached to the spring storing recess portions 20a and 20b function as a first urging member which urges the Y-direction movement ring 15 to the neutral position in a range where the Y-direction movement ring 15 can be moved.

Spring storing recess portions 15a and 15b are formed on the front side of the Y-direction movement ring 15. The spring storing recess portion 15a is formed in the upper side of the Y-direction movement ring 15. The spring storing recess portion 15b is formed in the lower side of the Y-direction movement ring 15. The spring units 50 are attached to the spring storing recess portions 15a and 15b respectively. The engagement members 53 attached to both ends of the metal shaft 51 among the spring unit 50 engage with the spring storing recess portion 15a or 15b. Then, the spring unit 50 is attached to the spring storing recess portion 15a or 15b with the coil spring 52 compressed.

The release base 22 is attached on the front side of the Y-direction movement ring 15 so that the release base 22 can be moved only in the X direction. As illustrated in FIG. 7A, shafts 22e, 22f, 22g, and 22h are projectingly formed on the back side of the release base 22. As illustrated in FIG. 7B, elongate holes 15g, 15h, 15i, and 15j are formed on the Y-direction movement ring 15. The shafts 22e, 22f, 22g, and 22h are inserted into the elongate holes 15g, 15h, 15i, and 15j respectively. The elongate holes 15g, 15h, 15i, and 15j are shaped long in the X direction. This enables the release base 22 to be moved only in the X direction with respect to the Y-direction movement ring 15. The release base 22 functions as an operation member attached to be capable of moving only in the second direction with respect to the Y-direction movement ring 15. The shafts 22e, 22f, 22g, and 22h and the elongate holes 15g, 15h, 15i, and 15j function as a second guide unit which moves the release base 22 only in the second direction (X direction) with respect to the Y-direction movement ring 15.

As illustrated in FIG. 7A, shafts 22a, 22b, 22c, and 22d are projectingly formed on the back side of the release base 22. As illustrated in FIG. 7B, elongate holes 15k, 15l, 15m, and 15n are formed on the Y-direction movement ring 15. The shafts 22a, 22b, 22c, and 22d are inserted into the elongate holes 15k, 15l, 15m, and 15n respectively. The elongate holes 15k, 15l, 15m, and 15n are shaped long in the X direction. This enables the release base 22 to be moved only in the X direction with respect to the Y-direction movement ring 15. A screw 24 is attached to the shaft 22a passing through the elongate hole 15k, so that the Y-direction movement ring 15 is held between the release base 22 and the screw 24. The shafts 22a, 22b, 22c, and 22d and the elongate holes 15k, 15l, 15m, and 15n function as a second guide unit which moves the release base 22 only in the second direction (X direction) with respect to the Y-direction movement ring 15.

The shaft 22b is inserted into the elongate hole 15l and a hole 20e formed in the front inner 20. The shaft 22c is inserted into the elongate hole 15m and a hole 20d formed in the front inner 20. A cam member 26 is fixed to the shaft 22b passing through the elongate hole 15l and a hole 20e and the shaft 22c passing through the elongate hole 15m and a hole 20d by a screw. This integrates the release base 22 with the cam member 26 while the Y-direction movement ring 15 and the front inner 20 are held between the release base 22 and the cam member 26. That is, the cam member 26 functions as a movable member capable of linearly moving with the release base 22 in an integrated manner.

The shaft 22d is inserted into the elongate hole 15n and a hole 20c formed in the front inner 20. A holding plate 27 is fixed to the shaft 22d passing through the elongate hole 15n and the hole 20c. Therefore, the Y-direction movement ring 15 and the front inner 20 are held between the release base 22 and the holding plate 27.

As illustrated in FIG. 7A, engagement portions 22i, 22j, 22k, and 22l are projectingly formed on the back side of the release base 22. Attaching the release base 22 to the Y-direction movement ring 15 causes the engagement members 53 each attached to the spring storing recess portion 15a to engage with the engagement portions 22i and 22j respectively. Attaching the release base 22 to the Y-direction movement ring 15 causes the engagement members 53 attached to the spring storing recess portion 15b to engage with the engagement portions 22k and 22l respectively. Attaching the release base 22 to the Y-direction movement ring 15 causes the engagement portions 22i, 22j, 22k, and 22l to contact with the upper winding end 52a or the lower winding end 52b of the coil spring 52 of the spring units 50 attached to the spring storing recess portions 15a and 15b.

Thereby, the release base 22 is urged by the spring units 50 each attached to the spring storing recess portions 15a and 15b to the neutral position in the X direction. In the state where the release base 22 is attached to the Y-direction movement ring 15, the spring units 50 each attached to the spring storing recess portions 15a and 15b are arranged in the projection surface of the release base 22. Since the Y-direction movement ring 15 is arranged in the projection surface of the release base 22, the spring units 50 each attached to the spring storing recess portions 15a and 15b are also arranged in the projection surface of the release base 22. The spring units 50 each attached to the spring storing recess portions 15a and 15b function as a second urging member for urging the release base 22 to the neutral position in a range where the release base 22 can be moved.

When the release ring 14 is linearly operated in the X direction, the release base 22 is linearly moved in the X direction with respect to the Y-direction movement ring 15. However, the Y-direction movement ring 15 is not linearly moved to the front inner 20. When the release ring 14 is linearly operated in the Y direction, the Y-direction movement ring 15 and the release ring 14 formed of the release base 22 and the release cap 23 is linearly moved to the front inner 20 in an integrated manner. However, the release base 22 is not linearly moved to the Y-direction movement ring 15.

Figure 8A:
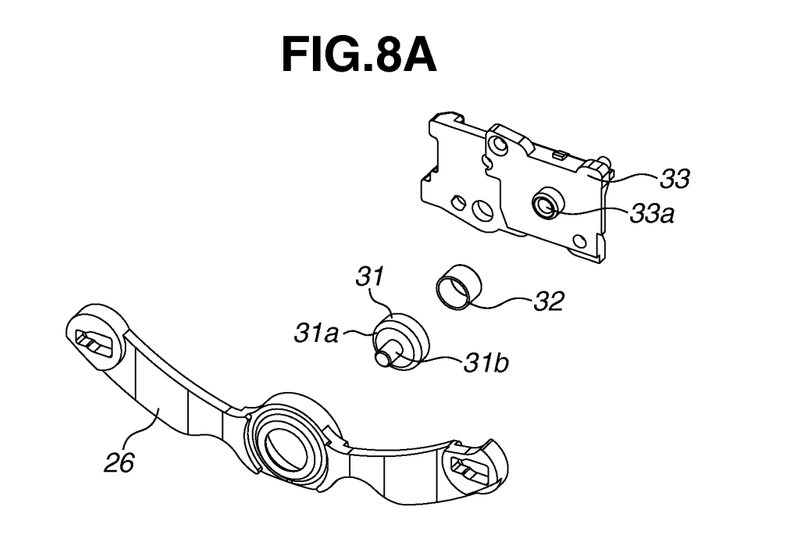
FIGS. 8A and 8B are exploded perspective views illustrating shapes of a cam member, a pushing member, an urging spring, and a guide member.
Figure 8B:
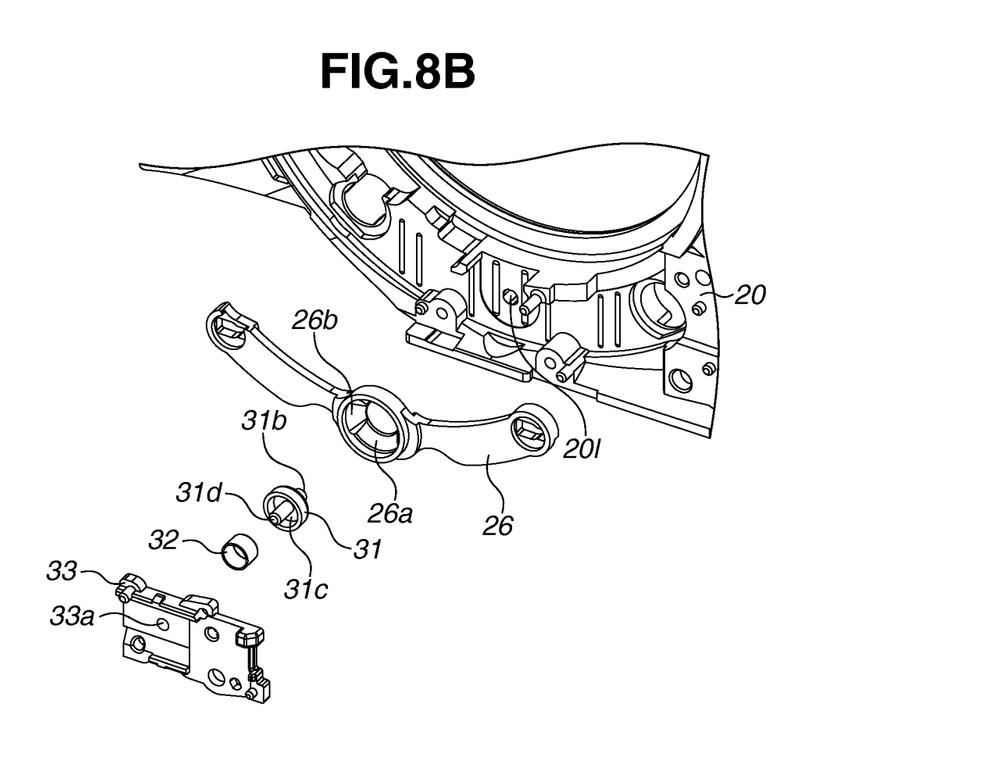

FIGS. 8A and 8B are exploded perspective views illustrating shapes of the cam member 26, a pushing member 31, an urging spring 32, and a guide member 33. FIG. 8A is an exploded perspective view illustrating the cam member 26, the pushing member 31, the urging spring 32, and the guide member 33 viewed from the front side. The front inner 20 is eliminated from FIG. 8A. FIG. 8B is an exploded perspective view illustrating the front inner 20, the cam member 26, the pushing member 31, the urging spring 32, and the guide member 33 viewed from the back side.

As illustrated in FIG. 8B, substantially cone-shaped cam portions 26a and 26b are formed on the back side of the cam member 26. The pushing member 31 is arranged at the back of the cam member 26. A sliding portion 31a, a first shaft 31b, a recess portion 31c, and a second shaft 31d are formed on the pushing member 31. As illustrated in FIG. 8B, the first shaft 31b is projectingly formed toward the front side from the sliding portion 31a. The second shaft 31d is projectingly formed toward the back side from the sliding portion 31a. The recess portion 31c is formed in such a manner that the back side of the sliding portion 31a is hollowed out.

Arranging the pushing member 31 on the back side of the cam member 26 slides the sliding portion 31a on the cam portions 26a and 26b of the cam member 26. Then, the first shaft 31b passes through the cam member 26 and is inserted into a guide hole 201 formed in the front inner 20.

The guide member 33 is arranged on the back side of the pushing member 31. A guide hole 33a is formed in the guide member 33. An urging spring 32 is arranged in the recess portion 31c of the pushing member 31 and the guide member 33 is fixed to the back side of the front inner 20 by a screw. Then, the second shaft 31d of the pushing member 31 is inserted into the guide hole 33a. The pushing member 31 is attached in such a manner that the pushing member 31 is held between the front inner 20 and the guide member 33. The pushing member 31 is movably attached along the shaft direction of the first shaft 31b and the second shaft 31d. The sliding portion 31a is pressed against the cam portions 26a and 26b by the urging spring 32.

The release switch 21c mounted on the front flexible wiring board 21 is arranged on the back side of the guide member 33. The pushing member 31 is moved to the back side against the urging spring 32, and then the leading edge of the second shaft 31d is caused to press the release switch 21c. The leading edge of the second shaft 31d presses the release switch 21c by a first press amount, and a first-stage switch of the release switch 21c is turned on. The leading edge of the second shaft 31d further presses the release switch 21c by a second press amount, and a second-stage switch of the release switch 21c is turned on. Therefore, the second shaft 31d functions as a shaft capable of pressing the release switch 21c.

Figure 9A:
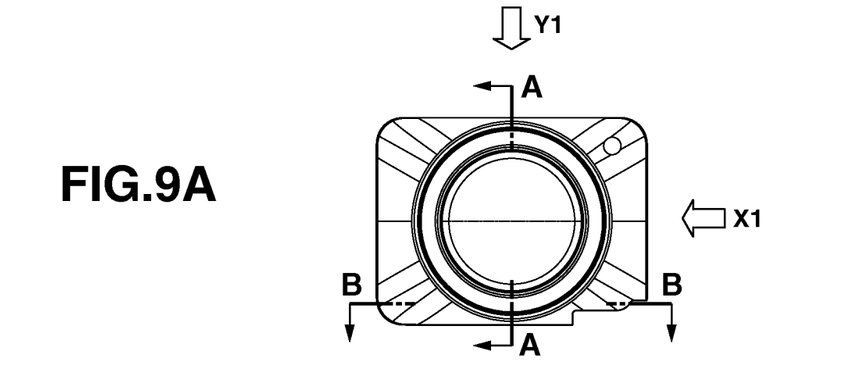
FIGS. 9A, 9B, and 9C are diagrams illustrating how the pushing member is moved when a release ring is linearly operated in an X direction.
Figure 9B:
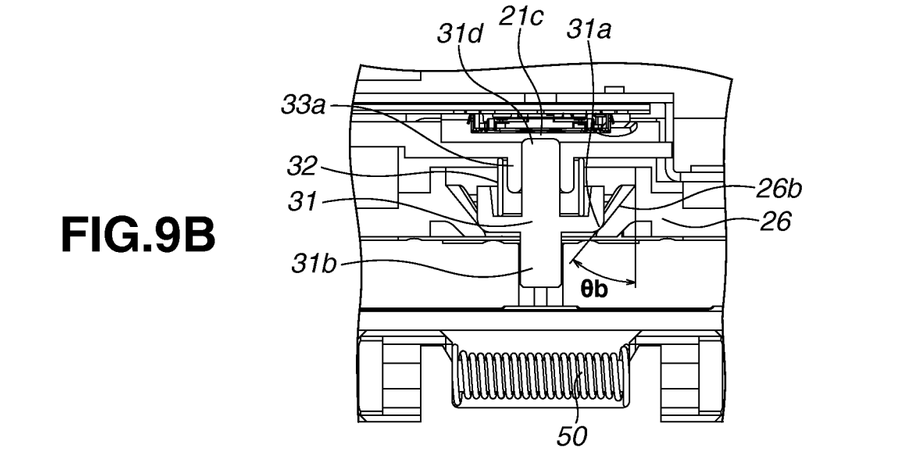
Figure 9C:
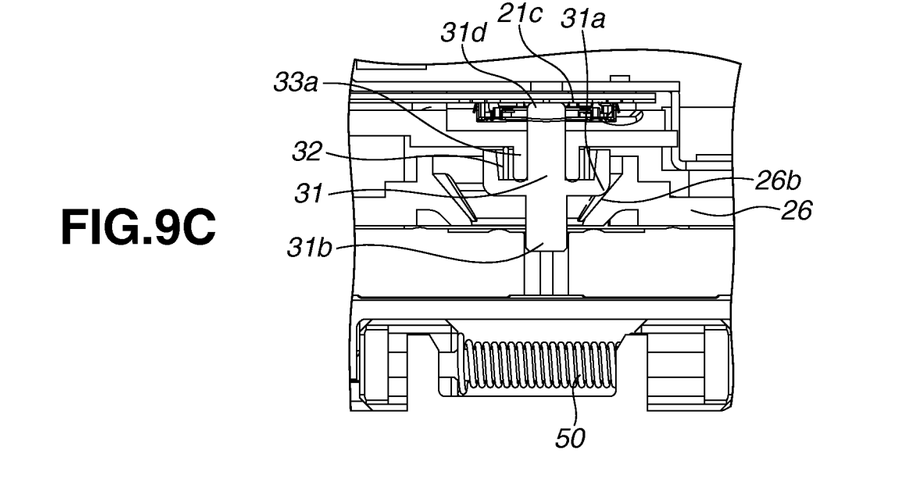

FIGS. 9A, 9B, and 9C are diagrams illustrating how the pushing member 31 is moved when the release ring 14 is linearly operated in the X direction. FIG. 9A is a front view illustrating the front cover unit 18. An X1 direction is defined by an arrow illustrated in FIG. 9A. FIG. 9B is a diagram illustrating cross section view taken along line B-B of the front cover unit 18 in a case where the release ring 14 is in the neutral position. FIG. 9C is a diagram illustrating a cross section view taken along line B-B of the front cover unit 18 in a case where the release ring 14 is linearly operated in the X1 direction from the neutral position.

As illustrated in FIG. 9B, when the release ring 14 is in the neutral position, the pushing member 31 is urged to the cam portions 26a and 26b of the cam member 26 by an urging force of the urging spring 32. In this state, the leading edge of the second shaft 31d does not contact with the release switch 21c, so that a gap is created between the leading edge of the second shaft 31d and the release switch 21c. From this state, in a case where the release ring 14 is linearly operated in the X1 direction, the sliding portion 31a of the pushing member 31 slides on the cam portion 26b and the pushing member 31 is moved to the back side against the urging spring 32. In a case where the pushing member 31 is moved to the back side against the urging spring 32, the gap between the leading edge of the second shaft 31d and the release switch 21c is gradually decreased and the leading edge of the second shaft 31d touches and presses the release switch 21c.

Figure 10A:
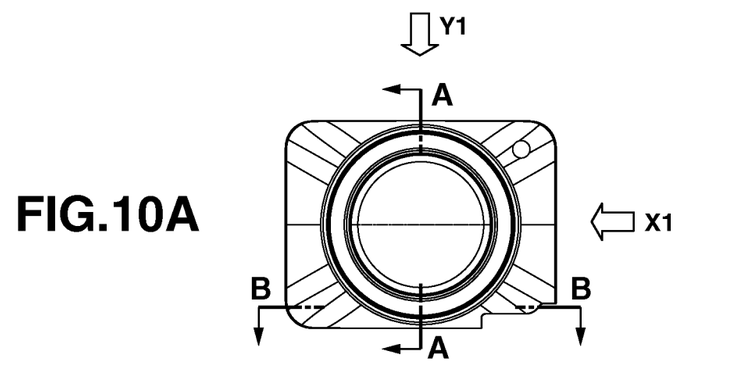
FIGS. 10A, 10B and 10C are diagrams illustrating how the pushing member is moved when the release ring is linearly operated in a Y direction.
Figure 10B:
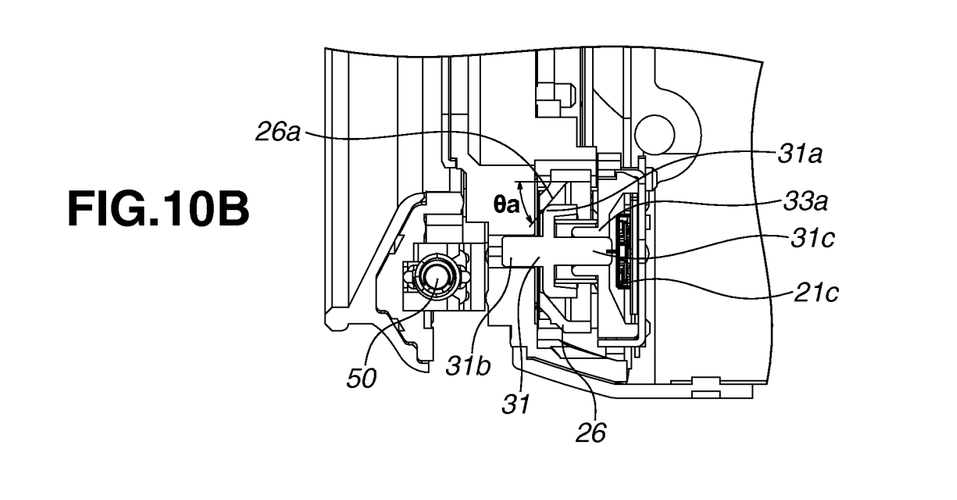
Figure 10C:
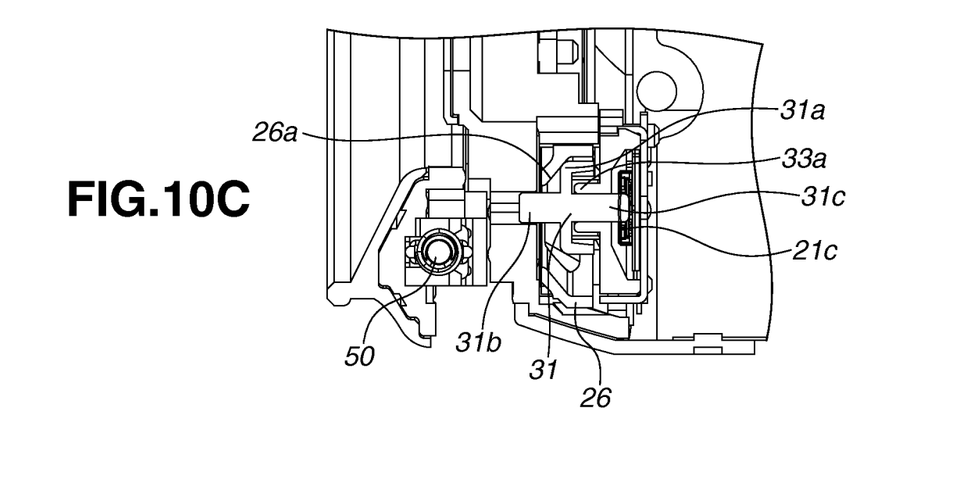

FIGS. 10A, 10B, and 10O are diagrams illustrating how the pushing member 31 is moved in a case where the release ring 14 is linearly operated in the Y direction. FIG. 10A is a diagram illustrating a front view of the front cover unit 18. A Y1 direction is defined by an arrow illustrated in FIG. 10A. FIG. 10B is a diagram illustrating a cross section view taken along line A-A of the front cover unit 18 in a case where the release ring 14 is in the neutral position. FIG. 10O is a diagram illustrating a cross section view taken along line A-A of the front cover unit 18 in a case where the release ring 14 is linearly operated in the Y1 direction from the neutral position.

As illustrated in FIG. 10B, when the release ring 14 is in the neutral position, the pushing member 31 is urged to the cam portions 26a and 26b of the cam member 26 by an urging force of the urging spring 32. In this state, the leading edge of the second shaft 31d does not contact with the release switch 21c, so that a gap is created between the leading edge of the second shaft 31d and the release switch 21c. From this state, in a case where the release ring 14 is linearly operated in the Y1 direction, the sliding portion 31a of the pushing member 31 slides on the cam portion 26a and the pushing member 31 is moved to the back side against the urging spring 32. In a case where the pushing member 31 is moved to the back side against the urging spring 32, the gap between the leading edge of the second shaft 31d and the release switch 21c is gradually decreased and the leading edge of the second shaft 31d touches and presses the release switch 21c.

A taper angle of the cam portion 26a with respect to the movement direction (Z direction) of the pushing member 31 is taken as θa and a taper angle of the cam portion 26b with respect to the movement direction (Z direction) of the pushing member 31 is taken as θb. According to the first exemplary embodiment, the cam portions 26a and 26b are formed in such a manner that the linear operation amounts required of the second shaft 31d to press the release switch 21c are made different from each other between a case in which the release ring 14 is linearly operated in the X direction and a case in which the release ring 14 is linearly operated in the Y direction.

According to the present exemplary embodiment, the cam portions 26a and 26b are formed in such a manner that the taper angle θa becomes larger than the taper angle θb. Therefore, the linear operation amount of the release ring 14 required of the leading edge of the second shaft 31d to press the release switch 21c is larger in the Y direction than in the X direction. More specifically, in a case where the release ring 14 is linearly operated in the X-direction, the linear operation amount required of the leading edge of the second shaft 31d to press the release switch 21c is comparatively smaller. On the other hand, in a case where the release ring 14 is linearly operated in the Y-direction, the linear operation amount required of the leading edge of the second shaft 31d to press the release switch 21c is comparatively larger. At a boundary portion between the cam portions 26a and 26b, a difference between the taper angles is made small. This gives little discomfort to the user even if the release ring 14 is linearly operated in an oblique intermediate direction between the X and Y directions.

The smaller the linear operation amount required of the leading edge of the second shaft 31d to press the release switch 21c is, the larger a force required of the leading edge of the second shaft 31d to press the release switch 21c becomes. The larger the linear operation amount required of the leading edge of the second shaft 31d to press the release switch 21c is, the smaller a force required of the leading edge of the second shaft 31d to press the release switch 21c becomes. In other words, the smaller the taper angle is, the heavier the linear operation of the release ring 14 becomes.

According to the present exemplary embodiment, in a case where the release ring 14 is linearly operated in the X direction, the release base 22 has only to be linearly moved to the Y-direction movement ring 15. For this reason, even if the taper angle θb of the cam portion 26b becomes small, the linear operation of the release ring 14 does not become extremely heavier. On the other hand, in a case where the release ring 14 is linearly operated in the Y direction, the release base 22 and the Y-direction movement ring 15 are linearly operated to the front inner 20. This increases a force required for the linear operation according as the number of members used for the linear operation increases. If the taper angle θa of the cam portion 26a is made small, the linear operation of the release ring 14 may become extremely heavy.

According to the present exemplary embodiment, the taper angles of the cam portions 26a and 26b are determined in consideration of such respects. In other words, the taper angles of the cam portions 26a and 26b are changed in such a manner that forces for turning on the release switch 21c are nearly equal to each other even if the release ring 14 is linearly operated in the X or Y direction.

According to the present exemplary embodiment, in a case where the release ring 14 is linearly operated in the X direction, the release ring 14 may be rotated with the first shaft 31b of the pushing member 31 as a center. In this case, the shaft 22d of the release base 22 abuts on the edge of the hole 20c formed in the front inner 20 to restrict the rotation of the release ring 14. In other words, the shaft 22d of the release base 22 functions as a restriction unit for restricting the rotation of the release ring 14 with respect to the front inner 20. The shaft 22d of the release base 22 is arranged in such a manner that a distance between the first shaft 31b of the pushing member 31 and the shaft 22d of the release base 22 is made larger than a distance between the first shaft 31b of the pushing member 31 and a center position of the release base 22. The shaft 22d of the release base 22 is arranged at a position that is nearly point symmetrical to the first shaft 31b of the pushing member 31 with respect to the center position of the release base 22.

In a case where the release base 22 is linearly operated in the X and Y directions, the diameter of the hole 20c is determined so that the second-stage switch of the release switch 21c is turned on and then the shaft 22d abuts on the edge of the hole 20c. Therefore, such a problem does not occur that the second-stage switch of the release switch 21c cannot be turned on because the shaft 22d abuts on the edge of the hole 20c.

According to the first exemplary embodiment described above, the taper angles of the cam portion on which the sliding portion 31a of pushing member 31 slides become different from each other between a case in which the release ring 14 is linearly operated in the X direction and a case in which the release ring 14 is linearly operated in the Y direction. According to a second exemplary embodiment, the taper angles of the cam portion on which the sliding portion 31a of pushing member 31 slides are made equal to each other between a case in which the release ring 14 is linearly operated in the X direction and a case in which the release ring 14 is linearly operated in the Y direction. According to the second exemplary embodiment, when the release ring 14 is linearly operated, the taper angles of the cam portion on which the sliding portion 31a slides are made different between a range where the first-stage switch of the release switch 21c is turned on and a range where the second-stage switch of the release switch 21c is turned on. A difference between the first and second exemplary embodiments is in a shape of the cam portion formed in the cam member. The configuration other than the cam member is similar to that described in the first exemplary embodiment. In the following description, the components same as those in the first exemplary embodiment are given the same reference characters and numerals as those in the first exemplary embodiment. The description thereof is omitted.

Figure 11A:
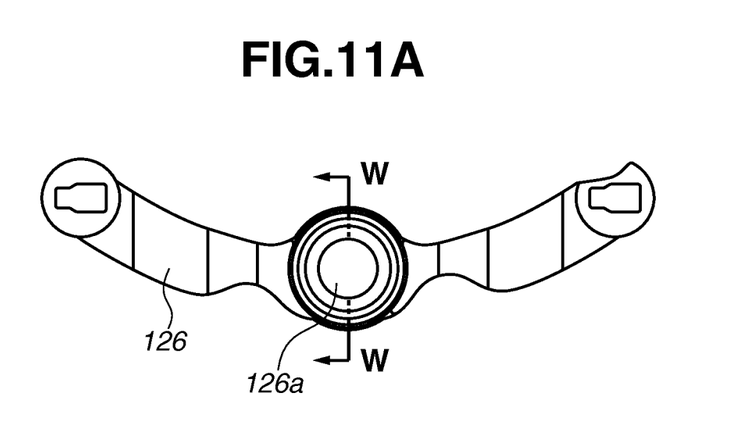
FIGS. 11A and 11B are diagrams each illustrating the shape of a cam member according to a second exemplary embodiment.
Figure 11B:
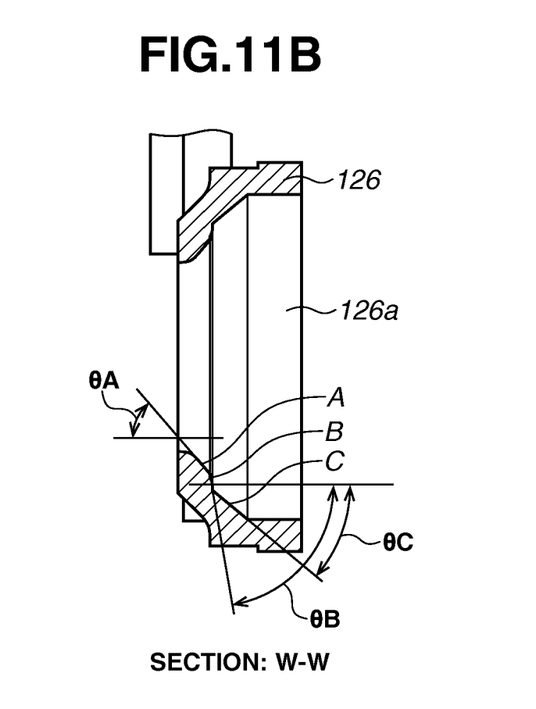

FIGS. 11A and 11B are diagrams illustrating the shape of a cam member 126 according to the second exemplary embodiment. FIG. 11A is a diagram illustrating a rear view of the cam member 126 according to the second exemplary embodiment. FIG. 11B is a diagram illustrating a cross section taken along W-W of the cam member 126.

As illustrated in FIG. 11A, a substantially cone-shaped cam portion 126a is formed on the back side of the cam member 126.

As illustrated in FIG. 11B, the substantially cone-shaped cam portion 126a is formed in such a manner that taper surfaces A, B, and C are formed in this order from the inside thereof. The taper surfaces A, B, and C are different from one another in the taper angle with respect to the movement direction (Z direction) of the pushing member 31.

The sliding portion 31a of the pushing member 31 slides on the taper surface A of the cam portion 126a in the range until the release ring 14 is linearly operated from the neutral position to bring the leading edge of the second shaft 31d of the pushing member 31 into contact with the release switch 21c, and the first-stage switch is turned on. The sliding portion 31a of the pushing member 31 slides on the taper surface B of the cam portion 126a in a state where the leading edge of the second shaft 31d of the pushing member 31 turns on the first-stage switch of the release switch 21c. The release ring 14 is linearly further operated to slide the sliding portion 31a of the pushing member 31 on the taper surface C of the cam portion 126a, whereby the second-stage switch of the release switch 21c is turned on by the leading edge of the second shaft 31d of the pushing member 31.

According to the present exemplary embodiment, the taper surfaces A, B, and C of the cam portion 126a are formed to satisfy the following conditional expression:

$$0°<\theta C<\theta A<\theta B\leq 90°,$$

where a taper angle of the taper surface A is θA, a taper angle of the taper surface B is θB, and a taper angle of the taper surface C is θC.

According to the present exemplary embodiment, the taper angle θA of the taper surface A is set to be larger than the taper angle θC of the taper surface C. For this reason, a force required for linearly operating the release ring 14 becomes smaller in the range where the sliding portion 31a of the pushing member 31 slides on the taper surface A of the cam portion 126a than in the range where the sliding portion 31a slides on the taper surface C. In other words, the linear operation of the release ring 14 is set to be lighter in the range until the first-stage switch is turned on than in the range until the first-stage switch is turned on and then the second-stage switch is turned on.

The digital camera according to the present exemplary embodiment executes the AF and AE operations by turning on the first-stage switch of the release switch 21c and the still image capturing by turning on the second-stage switch. Therefore, in a case where the first-stage switch is kept turned on without the second-stage switch being turned on, the linear operation of the release ring 14 is stopped halfway. In consideration of this point, according to the present exemplary embodiment, the linear operation of the release ring 14 is set to be heavier in the range until the first-stage switch is turned on and then the second-stage switch is turned on than in the range until the first-stage switch is turned on. Thereby, it becomes easy to stop the linear operation of the release ring 14 with the first-stage switch kept turned on and without the second-stage switch being turned on.

According to the present exemplary embodiment, the taper angle θB of the taper surface B is set to be larger than the taper angle θA of the taper surface A and the taper angle θC of the taper surface C. Accordingly, a force required for linearly operating the release ring 14 becomes smaller in the range where the sliding portion 31a of the pushing member 31 slides on the taper surface B of the cam portion 126a than in the range where the sliding portion 31a slides on the taper surface A. That is, when the release ring 14 is linearly operated, the linear operation of the release ring 14 becomes lighter at the timing of when the first-stage switch is turned on, so that the user can clearly recognize that the first-stage switch is turned on. In a case where the first-stage switch is kept turned on without the second-stage switch being turned on, the linear operation of the release ring 14 has only to be stopped immediately after the linear operation of the release ring 14 becomes lighter. This makes it easy for the user to recognize when to stop the linear operation of the release ring 14.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-100827 filed May 14, 2014, which is hereby incorporated by reference herein in its entirety.

What is claimed is:

1. An electronic apparatus comprising:
   a base member;
   a switch;
   an operation member configured to linearly move in a first direction and a second direction orthogonal to the first direction with respect to the base member;
   a movable member configured to linearly move integrally with the operation member, in a case where the operation member is linearly operated in the first direction or the second direction; and
   a pressing member, configured to move in a third direction orthogonal to the first and second directions,
   wherein the pressing member has a pressing portion configured to press the switch and a sliding portion which slides on the movable member, and
   wherein in a case where the operation member is linearly operated in the first or second direction, the pressing member moves in the third direction by sliding of the sliding portion of the pressing member on the movable member, and the pressing portion presses the switch.

2. The electronic apparatus according to claim 1,
   wherein a cam portion having cone-shape is formed in the movable member, and
   wherein in a case where the operation member is linearly operated in the first or second direction, the pressing member moves in the third direction by sliding of the sliding portion of the pressing member on the cam portion, and the pressing portion presses the switch.

3. The electronic apparatus according to claim 1,
   wherein the movable member is attached to the base member so as to be movable only in the first direction, and
   wherein the operation member is attached to the movable member so as to be movable only in the second direction.

4. The electronic apparatus according to claim 3, further comprising:
   a first urging member configured to urge the movable member to a neutral position in a range where the movable member is able to move, the first urging member being arranged between the movable member and the base member; and
   a second urging member configured to urge the operation member to a neutral position in a range where the operation member is able to be operated, the second urging member being arranged between the operation member and the movable member,
   wherein the first urging member is arranged in a projection surface of the movable member in the base member, and
   wherein the second urging member is arranged in the projection surface of the movable member in the operation member.

5. The electronic apparatus according to claim 4, further comprising a third urging member configured to urge the pressing member in a direction in which the pressing portion of the pressing member moves away from the switch.

6. The electronic apparatus according to claim 1,
   wherein the operation member has a ring shape,
   wherein a restriction unit for restricting a rotation of the operation member with respect to the base member is formed in the operation member, and
   wherein the restriction unit is arranged in such a manner that a distance from the pressing portion of the pressing member to the restriction unit is larger than a distance from the pressing portion of the pressing member to a center position of the ring shape of the operation member.

7. The electronic apparatus according to claim 6, wherein the restriction unit is arranged at a position that is nearly point symmetrical to the pressing portion of the pressing member with respect to the center position of the ring-shape of the operation member.

8. The electronic apparatus according to claim 3, further comprising:
   a first guide portion configured to guide the movable member only in the first direction with respect to the base member; and
   a second guide portion configured to guide the operation member only in the second direction with respect to the movable member,
   wherein the second guide portion restricts a rotation of the base member of the operation member.

9. The electronic apparatus according to claim 2, wherein the cam portion of the movable member is formed in such a manner that operation amounts of the operation member required of the pressing portion of the pressing member to press the switch are different from each other between a case in which the operation member is linearly operated in the first direction and a case in which the operation member is linearly operated in the second direction.

10. The electronic apparatus according to claim 9, wherein the cam portion of the movable member is formed in such a manner that an operation amount of the operation member required of the pressing portion of the pressing member to press the switch becomes larger in the case in which the operation member is linearly operated in the first direction than in the case in which the operation member is linearly operated in the second direction.

11. The electronic apparatus according to claim 2,
   wherein the switch is a two-stage switch for outputting a first signal and a second signal, the switch being pressed by the pressing portion of the pressing member by a first press amount so that the first signal is output and the switch being pressed by the pressing portion of the pressing member by a second press amount larger than the first press amount so that the second signal is output, and
   wherein the cam portion of the movable member is formed in such a manner that an operation amount of the operation member in the first direction or the second direction until the switch outputs the first signal is different from an operation amount of the operation member in the first direction or the second direction until the switch outputs the first signal and then outputs the second signal.

12. The electronic apparatus according to claim 11, wherein the cam portion of the movable member is formed in such a manner that the operation amount of the operation member in the first direction or the second direction until the switch outputs the first signal is larger than the operation amount of the operation member in the first direction or the second direction until the switch outputs the first signal and then outputs the second signal.

* * * * *